US009223580B2

(12) United States Patent
Eichenberger et al.

(10) Patent No.: US 9,223,580 B2
(45) Date of Patent: Dec. 29, 2015

(54) SYSTEMS, METHODS AND COMPUTER PRODUCTS FOR CROSS-THREAD SCHEDULING

(75) Inventors: Alexandre E. Eichenberger, Chappaqua, NY (US); Michael K. Gschwind, Chappaqua, NY (US); John A Gunnels, Yorktown Heights, NY (US); James L. McInnes, Toronto (CA); Mark P. Mendell, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 2129 days.

(21) Appl. No.: 11/847,556

(22) Filed: Aug. 30, 2007

(65) Prior Publication Data

US 2009/0064152 A1 Mar. 5, 2009

(51) Int. Cl.

| | |
|---|---|
| ***G06F 9/455*** | (2006.01) |
| ***G06F 9/46*** | (2006.01) |
| ***G06F 9/38*** | (2006.01) |
| ***G06F 9/45*** | (2006.01) |

(52) U.S. Cl.
CPC .............. *G06F 9/3851* (2013.01); *G06F 8/445* (2013.01); *G06F 9/3885* (2013.01)

(58) Field of Classification Search
None
See application file for complete search history.

(56) References Cited

U.S. PATENT DOCUMENTS

2005/0071438 A1* 3/2005 Liao et al. ..................... 709/214
2005/0071841 A1* 3/2005 Hoflehner et al. ............ 718/100

* cited by examiner

*Primary Examiner* — Corey S Faherty
(74) *Attorney, Agent, or Firm* — Cantor Colburn LLP; Parashos Kalaitzis

(57) ABSTRACT

Systems, methods and computer products for cross-thread scheduling. Exemplary embodiments include a cross thread scheduling method for compiling code, the method including scheduling a scheduling unit with a scheduler sub-operation in response to the scheduling unit being in a non-multi-threaded part of the code and scheduling the scheduling unit with a cross-thread scheduler sub-operation in response to the scheduling unit being in a multithreaded part of the code.

8 Claims, 4 Drawing Sheets

400

| cycles | thread 1 | thread 2 |
|---|---|---|
| 0 | L1 | |
| 1 | | L1 |
| 2 | L2 | |
| 3 | | L2 |
| 4 | L3 | |
| 5 | | L3 |
| 6 | L4 | |
| 7 | | L4 |
| 8 | L5 | |
| 9 | +1 | L5 |
| 10 | | +1 |
| 11 | +2 | |
| 12 | | +2 |
| 13 | +3 | |
| 14 | | +3 |
| 15 | +4 | |
| 16 | S1 | +4 |
| 17 | | S1 |

| cycles | ops |
|---|---|
| 0 | L1 |
| 1 | L2 |
| 2 | L3 |
| 3 | L4 |
| 4 | L5 |
| 5 | +1 |
| 6 | +2 |
| 7 | +3 |
| 8 | +4 |
| 9 | S1 |

FIG. 3

| cycles | thread 1 | thread 2 |
|---|---|---|
| 0 | L1 | |
| 1 | | L1 |
| 2 | L2 | |
| 3 | | L2 |
| 4 | L3 | |
| 5 | | L3 |
| 6 | L4 | +1 |
| 7 | +1 | L4 |
| 8 | L5 | +1 |
| 9 | +2 | L5 |
| 10 | | +2 |
| 11 | +3 | |
| 12 | | +3 |
| 13 | +4 | |
| 14 | S1 | +4 |
| 15 | | S1 |

| cycles | mem | add |
|---|---|---|
| 0 | L1 | |
| 1 | L2 | |
| 2 | L3 | +1 |
| 3 | L4 | +1 |
| 4 | L5 | |
| 5 | | +2 |
| 6 | | +3 |
| 7 | | +4 |
| 8 | S1 | |
| 9 | | |

800

| cycles | thread 1 | thread 2 |
|---|---|---|
| 0 | L1 | |
| 1 | | L1 |
| 2 | L2 | |
| 3 | | L2 |
| 4 | L3 | |
| 5 | +1 | L3 |
| 6 | L4 | +1 |
| 7 | | L4 |
| 8 | +2 | |
| 9 | L5 | +2 |
| 10 | +3 | L5 |
| 11 | | +3 |
| 12 | +4 | |
| 13 | S1 | +4 |
| 14 | | S1 |

805

700

| cycles | ops |
|---|---|
| 0 | L1 |
| 1 | L2 |
| 2 | L3 |
| 3 | +1 |
| 4 | L4 |
| 5 | +2 |
| 6 | L5 |
| 7 | +3 |
| 8 | +4 |
| 9 | S1 |

G

705

SYSTEMS, METHODS AND COMPUTER PRODUCTS FOR CROSS-THREAD SCHEDULING

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND OF THE INVENTION

1. Field of the Invention

This invention relates to compilers and schedulers in multithreaded environments, and particularly to systems, methods and computer products for cross-thread scheduling.

2. Description of Background

Current design-goals on multithread machines focus on achieving multiple instructions issuing but with limitation on the number of simultaneously issued operations per cycle. One example of the above-mentioned machine is a multiple instruction issue machine with limited same-thread multiple issues (e.g., a machine that can issue two instructions per cycle: one arithmetic-logic unit (ALU) one Memory unit (MEM) but only one instruction per thread). This design-goal would require multi-threading in order to achieve high throughput. In addition, it is appreciated that instruction level parallelism (ILP) traditionally exploited by compiler-based instruction schedulers cannot be achieved within a single thread. Thus, multiple threads are considered. What is needed is thread instruction scheduling to maximize the likelihood of high throughput of the machine (i.e. of all the threads running concurrently).

SUMMARY OF THE INVENTION

Exemplary embodiments include a cross thread scheduling method for compiling code, the method including scheduling the scheduling unit with a cross-thread scheduler sub-operation in response to the scheduling unit being in a multithreaded part of the code, wherein the cross-thread scheduler sub-operation includes instructions to identify a plurality of operations that are ready to be scheduled in the cycle, wherein the plurality of operations includes operations whose input are ready in the cycle, operations whose consumed resource are available in the cycle, and operations whose input are nearly ready to be scheduled, identify one operation of the plurality of operations that at least one of contributes to a critical path and uses a critical resource, assign priority to operations that alternate a resource usage pattern, assign the one operation to a current scheduling time and update available resources for current scheduling time.

Further exemplary embodiments include a cross thread scheduling system for compiling code, the system including a processor coupled to a memory; and a process residing in the memory having instructions to schedule the scheduling unit with a cross-thread scheduler sub-operation in response to the scheduling unit being in a multithreaded part of the code, wherein the cross-thread scheduler sub-operation includes instructions to identify a plurality of operations that are ready to be scheduled in the cycle, wherein the plurality of operations includes operations whose input are ready in the cycle, operations whose consumed resource are available in the cycle, and operations whose input are nearly ready to be scheduled, identify one operation of the plurality of operations that at least one of contributes to a critical path and uses a critical resource, assign priority to operations that alternate a resource usage pattern, assign the one operation to a current scheduling time and update available resources for current scheduling time.

Additional exemplary embodiments include a method for scheduling instructions to optimize performance across threads in a multithreaded processor, the method including determining thread scheduling parameters in the multithreaded processor and selecting an instruction for scheduling the parameters.

System and computer program products corresponding to the above-summarized methods are also described and claimed herein.

Additional features and advantages are realized through the techniques of the present invention. Other embodiments and aspects of the invention are described in detail herein and are considered a part of the claimed invention. For a better understanding of the invention with advantages and features, refer to the description and to the drawings.

TECHNICAL EFFECTS

As a result of the summarized invention, technically we have achieved a compiler solution which provides cross-thread scheduling for computer application programs having multi-threaded portions of code.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIG. 3 illustrates a schedule for a single-issue machine in accordance with exemplary embodiments;

FIG. 4 illustrates a dual-issue execution record in accordance with exemplary embodiments;

The detailed description explains the preferred embodiments of the invention, together with advantages and features, by way of example with reference to the drawings.

DETAILED DESCRIPTION OF THE INVENTION

Exemplary embodiments include systems and methods that increase the overall throughput of the machine by scheduling a thread and keeping track of its interaction with other threads. In exemplary embodiments, since highly threaded systems require highly threaded applications, the systems and methods described herein implement the interaction of multiple threads from a single application. In exemplary embodiments, the systems and methods described herein provide scheduling instructions that are designed to improve performance of code that runs in a way that processor resources are shared among two or more threads.

In exemplary embodiments, a scheduler explicitly replicates the instructions of the task being scheduled with a similar, concurrent task. As such, the scheduler can immediately compute the impact of interleaved executions of the multiple threads running concurrently on the system. The systems and methods described herein are flexible with respect to constraints and thread scheduling policies, but incur a larger scheduling overhead because they keep track of the resource usages of multiple threads.

In further exemplary embodiments, the scheduler directly integrates the impact of the current schedule with itself and keeps track of the effective latencies of the interleaved instructions by keeping track of the instructions in flight between two dependent instructions, taking into account the multiple threads in flight. Similarly, the systems and methods attempt to maximize overall throughput by favoring suitable pattern of resource consumptions among consecutive instructions so as to maximize multiple instruction issuing per cycle.

Figure 1:
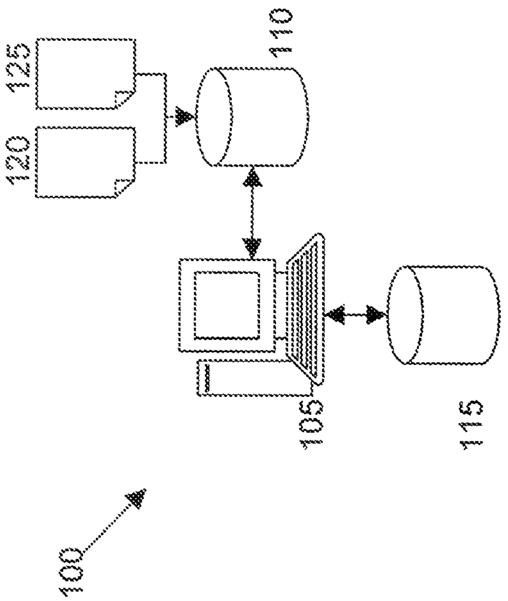
FIG. 1 illustrates an exemplary system for cross-thread scheduling.

FIG. 1 illustrates an exemplary system 100 for cross-thread scheduling. In exemplary embodiments, the system 100 includes a processing device 105 such as a computer, which includes a storage medium or memory 110. The memory 110 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 110 may incorporate electronic, magnetic, optical, and/or other types of storage media. Note that the memory 110 can have a distributed architecture, where various components are situated remote from one another, but can be accessed by the processing device 105.

A data repository 115 is coupled to and in communication with the processing device 105. The system 100 can further include a compiler 120. The compiler 120 can be any computer program (or set of programs) that translates text written in a computer language (the source language) into another computer language (the target language). The original sequence is usually called the source code and the output called object code. It is appreciated that the compiler can handle code having multi-threaded portions as further described herein. The system 100 can further include cross-thread scheduling process 125, as further discussed herein.

Figure 2:
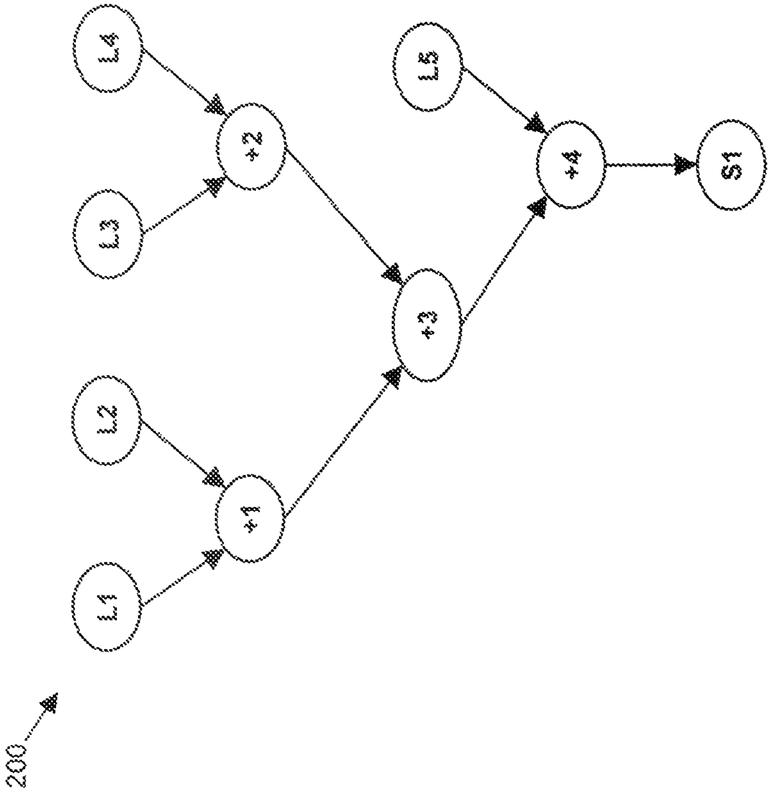
FIG. 2 illustrates an exemplary computation used for illustration purposes.

In exemplary embodiments, the system 100 described above can include a dual issue machine from different threads implementing round-robin policy having one memory with two cycle loads, one cycle store, and one compute with one cycle add as now described. FIG. 2 illustrates a chart 200 of dual issue from different threads implementing round-robin policy. In this chart, the L1, L2, L3, L4, and L5 denote load instructions that load a value from memory into the register file. Load instructions use the MEM unit, in our exemplary machine model. Also in this chart, the S1 instruction stores a value from a register to memory. Store instructions also uses the MEM unit in our exemplary machine model. Also in this chart, the "+1", "+2", and "+4" are arithmetic instructions. They use the ALU unit in our exemplary machine model. In developing a schedule for the above-referenced example, several approaches can be implemented including: 1) schedule as if it is a single issue machine; 2) schedule as if it is a dual issue machine; and 3) schedule as if it is a dual issue machine with half the latencies.

FIG. 3 illustrates a schedule 300 for a single-issue machine in accordance with exemplary embodiments. FIG. 4 illustrates a dual-issue execution record 400 in accordance with exemplary embodiments. For a single-issue machine, the goal is to minimize overall latency, which is typically done by scheduling long latency ops first (i.e., all the loads first to obtain the data). Subsequently, the additions can then be scheduled (i.e., all the data that is available by the time the additions are scheduled.) Finally, the store can be scheduled. Referring to the schedule 300 in FIG. 3, long, uninterrupted sequences of loads and long, uninterrupted sequences of adds. As such, for the interaction for two schedules for two threads, as seen in FIG. 4, only two cycles 405, 410 of the eighteen cycles are dual issued. In considering a schedule for a dual-issue machine, the interaction of the two threads differs as now described.

Figure 6:
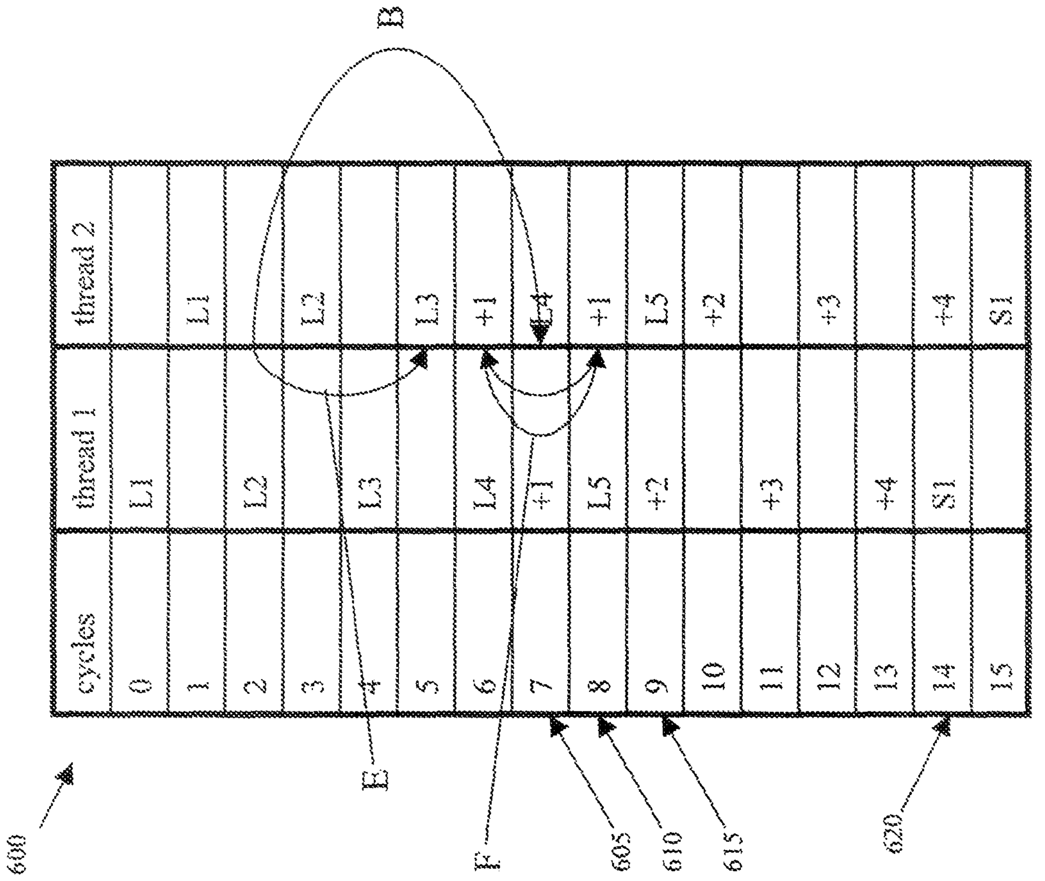
FIG. 6 illustrates a dual-issue execution record in accordance with exemplary embodiments.
Figure 5:
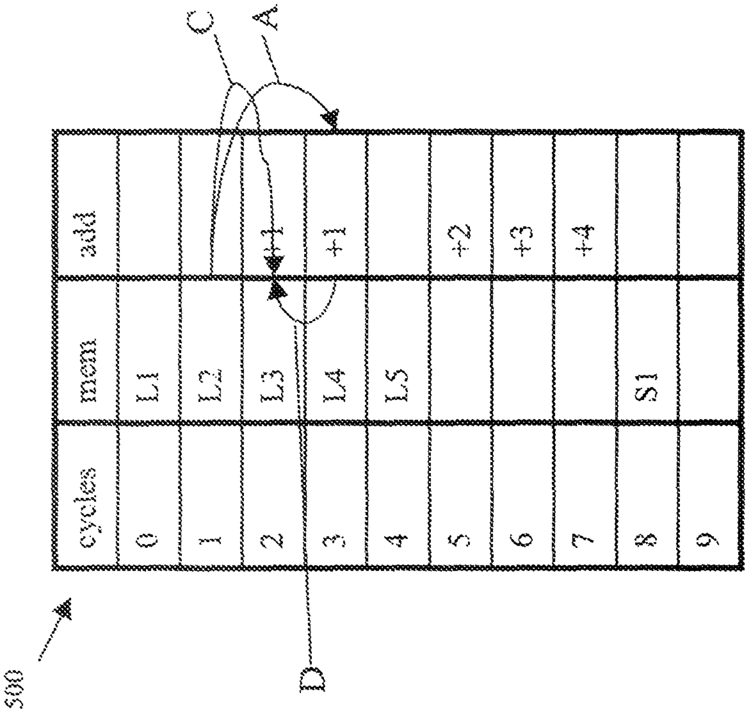
FIG. 5 illustrates a schedule for a dual-issue machine in accordance with exemplary embodiments.

FIG. 5 illustrates a schedule 500 for a dual-issue machine in accordance with exemplary embodiments. FIG. 6 illustrates a dual-issue execution record 600 in accordance with exemplary embodiments. For a dual issue machine, the resources are each modeled as seen in FIGS. 5 and 6. Although it is appreciated that scheduling two instructions in the same thread is not possible, from the instruction scheduler's perspective, it is possible. As such, the scheduling heuristics are similar as those heuristics discussed with respect to FIGS. 3 and 4, except for the fact that the instruction scheduler is now allowed to pack up to two instructions per cycle, one using the MEM unit and one using the ALU unit. As stated above, this instruction scheduler model does not correspond to the actual hardware of our exemplary machine since it is not actually possible to schedule two instructions from a single thread in the same cycle in the exemplary machine. As such, looking at the schedule in FIG. 5, a slightly shorter uninterrupted sequences of loads (and adds, respectively) are observed. It is appreciated that cycles 605, 610, 615, 620 of the sixteen cycles are now dual-issued. As such, the schedule of FIGS. 5 and 6 works better at interleaving ALU and MEM because a single thread is deemed to dual issue which enables the scheduler to schedule other instructions (namely the adds) earlier. These instructions are not as directly in the critical path (i.e., the loads have more critical latencies), because of the separate resources for which the ALU and MEM do not directly compete with one another.

Referring still to FIGS. 5 and 6, the latencies are now discussed. It is appreciated that the static latencies are overly conservative. MEM has a two-cycle latency as illustrated by arrow A, thus the +1 is scheduled two cycles after L2. However, referring to FIG. 6, the two cycles (arrow A in FIG. 5) end up five cycles apart in the dual-issue execution record 600 as illustrated by arrow B.

In exemplary embodiments, to address this cycle discrepancy, the strategy for the dual-issue machine as discussed above is implemented. In the case of a schedule for a dual-issue, half-latency machine, the methods described herein schedule for a dual issue fictive machine, but assume half length latencies with the goal that the other thread interleaves extra cycles between dependent operations, as illustrated by arrow C in FIG. 5, which promotes the +1 to the second cycle, as illustrated by arrow D. The promotion of +1 is further illustrated as arrow E in FIG. 6. The interleaved thread addressing the two-cycle latency is illustrated as arrows E and F in FIG. 6.

Figures 7, 8, 9:
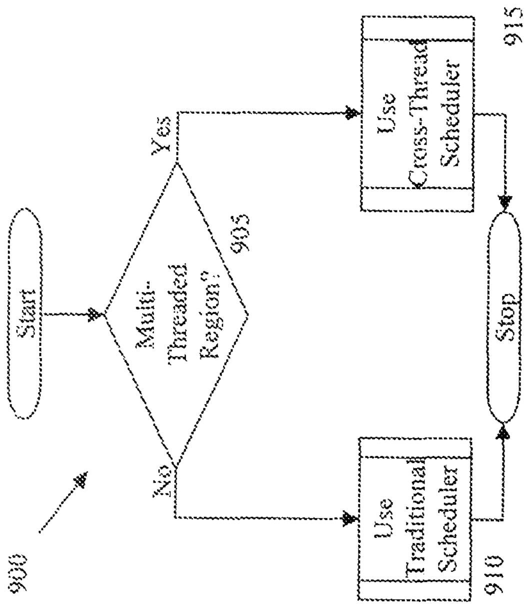
FIG. 7 illustrates a cross-thread schedule in accordance with exemplary embodiments.
FIG. 8 illustrates a cross-thread execution record in accordance with exemplary embodiments.
FIG. 9 illustrates a flow chart of a scheduler method in accordance with exemplary embodiments.

In exemplary embodiments, the systems and methods described herein implement a cross threads schedule. FIG. 7 illustrates a cross-thread schedule 700 in accordance with exemplary embodiments. In exemplary embodiments, to create a schedule, the systems and methods uses the actual resources available to a single thread. Furthermore, the systems and methods described herein favor alternating ALU/MEM when possible. It is appreciated that the systems and methods described herein further accept shorter latencies when it enables more alternating ALU/MEM. It is further appreciated that a one cycle latency tradeoff for increased alternating is realized, as illustrated by arrow G. It is further appreciated that five cycles with alternative ALU/MEM are achieved as indicated by label 705, which results in five cycles in dual issue mode (see FIG. 8), overcome bits of stalling as indicated by label 805.

There fore it is appreciated that for machines, scheduling for 1) single issue->18 cycles 2) dual issue->16 cycles and 3) dual issue, half latencies->16 cycles is sub-optimal. In exemplary embodiments, the best results are achieved by directly scheduling for a single issue thread, but attempting to skew the mix of ALU/MEM, even possibly inserting some stalling in favor of a better mix of operations FIG. 9 illustrates a flow chart of a scheduler method 900 in accordance with exemplary embodiments. The method makes a determination whether a scheduling unit is in a multithreaded part of the code at step 905. In exemplary embodiments, this determination is made by the compiler, profiling, and/or input from the user and/or operating system. If the scheduling unit is not in a multithreaded part of the code at step 905, then the unit is scheduled using the traditional scheduler at step 910. If the scheduling unit is in a multithreaded part of the code at step 905, then the unit is scheduled using the embodiments of the cross-thread scheduler at step 915.

For the traditional scheduler at step 910, while there are unscheduled ops, the following steps can be implemented: 1) while no ops are ready to be scheduled in this cycle, increment the time, 2) look at all the ops that are ready to be scheduled in this cycle and a) include ops whose input are ready in this cycle and b) whose consumed resource are available in this cycle, 3) pick the op that contributes most critically to critical path and/or use a critical resource, 4) assign this op to the current scheduling time, and 5) update the available resources for current scheduling time accordingly. In exemplary embodiments, a traditional resource and latency model can be implemented, as appropriate with the machine e.g. single issue with full hardware latencies for an exemplary machine.

For the cross-thread scheduler at step 915, while there are unscheduled ops, the following steps can be implemented: 1) while no ops are ready to be scheduled in this cycle, increment the time, 2) look at all the ops that are ready to be scheduled in this cycle and a) include ops whose input are ready in this cycle and b) whose consumed resource are available in this cycle, and c) also includes ops whose input are nearly ready to be scheduled, 3) pick the op that contributes most critically to critical path and/or use a critical resource, a) among these critical ops, give priority to ops that alternate the resource pattern (e.g., alternating ALU/MEM on our exemplary machine, 4) assign this op to the current scheduling time, and 5) update the available resources for current scheduling time accordingly.

In exemplary embodiments, for those ops whose input are nearly ready, while it is preferable to consider operations whose input have satisfied the full hardware latency of the operations computing these inputs, those operations that have satisfied a given fraction of the full hardware latency are also considered. The said fraction can be set by the compiler, via profiling, or from input of the operating system and/or user. This fraction can be shared for all instructions, or be specific for groups of instructions, or be specific for each instruction, or specific to particular pairs of dependent instructions.

In exemplary embodiments, a simple resource model with a dual issue machine and with only two type of resources (ALU and MEM) is implemented, which leads to the simple policy of alternating ALU and MEM instructions in the schedule. For more complex resource models, different patterns may be required as warranted by the model. In exemplary embodiments, a more complex model, a more complex pattern, or a set of patterns, or even a state machine that captures the constraints on the cross thread issuing constraints may be required. In exemplary embodiments, where the machine allows each thread to issue one instruction per cycle but there are more than two types of resources, a scheduling policy of having the different resource types to appear cyclically according to some fixed ordering of the resource types can be adopted, would provide benefits in an environment with more than two threads.

In exemplary embodiments, for those operations that alternate the resource usage pattern, which are given priority, the most critical ops that have fully satisfied their input hardware latency are first considered. If among these operations an operation that satisfies the resource usage pattern can be found then that operation is selected. If an operation that satisfies the resource usage pattern cannot be found, the search is extended to operations that are less critical. If an operation that satisfies the resource usage pattern cannot be found, the search is extended to operations that have satisfied the said fraction of their input hardware latency.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method, comprising:

receiving a code including multi-thread and non-multi-thread portions;

determining, by a compiler, whether the multi-thread portion of the code are being received; and generating a schedule for the multi-thread portions of the code, in response to the determining that the multithread portion is being received, by a cross-thread scheduler of the compiler, by:

identifying a plurality of operations in the multi-thread portion of the code that are unscheduled, selecting a plurality of critical operations from the plurality of operations, each critical operation being an operation that contributes to a critical path or utilizes a critical resource, prioritizing the plurality of critical operations, each critical operation including a corresponding latency, according to a length of each corresponding latency, and assigning the plurality of operations in an alternating resource pattern to the schedule according to the prioritizing.

2. The method of claim 1, wherein the alternating resource pattern includes:

alternate arithmetic-logic unit instructions and memory unit instructions in the schedule during the assigning of the of plurality of operations to the schedule.

3. The method of claim 1, further comprising:

determining, by the compiler, whether the non-multi-thread portion of the code is being received; and generating a schedule for the non-multi-thread portion of the code, in response to the compiler determining that the non-multi-thread portion is being received, by an alternate scheduler of the compiler.

4. The method of claim 1, further comprising:

selecting a plurality of fraction operations from the at least one of plurality of operations, in response to the identifying that the at least one of the plurality of operations is unscheduled, each fraction operation being an operation that satisfies a fraction of their input hardware latency.

5. A system that includes a processor coupled to a memory and that is configured to:

receive a code including multi-thread and non-multi-thread portions;

determine, by a compiler, whether the multi-thread portion of the code is being received; and generate a schedule for the multi-thread portion of the code, in response to the determining that the multi-thread portion is being received, by a cross-thread scheduler of the compiler, by the cross-thread scheduler being configured to:

identify a plurality of operations in the multi-thread portion of the code that are unscheduled, select a plurality of critical operations from the plurality of operations, each critical operation being an operation that contributes to a critical path or utilizes a critical resource, prioritize the plurality of critical operations, each critical operation including a corresponding latency, according to a length of each corresponding latency, and assign the plurality of operations in an alternating resource pattern to the schedule according to the prioritizing receiving a code including multi-thread and non-multi-thread portions.

6. The system of claim 5, wherein the alternating resource pattern includes:

alternate arithmetic-logic unit instructions and memory unit instructions in the schedule.

7. The system of claim 5, wherein the system is configured to:

determine, by the compiler, whether the non-multi-thread portion of the code is being received; and generate a schedule for the non-multi-thread portion of the code, in response to the compiler the determination that the non-multi-thread portion is being received, by an alternate scheduler associated with the processor.

8. The system of claim 5, wherein the system is configured to:

select a plurality of fraction operations from the at least one of plurality of operations, in response to the identification of the at least one of the plurality of operations being unscheduled, each fraction operation being an operation that satisfies a fraction of their input hardware latency.

* * * * *